United States Patent [19]

Leonardi

[11] Patent Number: 5,248,539
[45] Date of Patent: Sep. 28, 1993

[54] FRICTION PAD FOR A WINDOW STABILIZER

[76] Inventor: Hugo Leonardi, 2208 Dryden Rd., Metamora, Mich. 48455

[21] Appl. No.: 611,977

[22] Filed: Nov. 13, 1990

[51] Int. Cl.⁵ .................. B32B 33/00; B05D 1/14; B05D 1/16
[52] U.S. Cl. .................... 428/88; 428/89; 428/90; 428/95
[58] Field of Search .................. 428/88, 89, 90, 92, 428/95

[56] References Cited

U.S. PATENT DOCUMENTS

| | | | |
|---|---|---|---|
| 3,401,075 | 9/1968 | Jackson | 428/90 |
| 3,616,135 | 10/1971 | Tesainer | 428/90 X |
| 3,936,554 | 2/1976 | Squier | 428/90 X |
| 4,180,606 | 12/1979 | Hance et al. | 428/90 X |
| 4,362,773 | 12/1982 | Shikinam; Shikinami | 428/90 |
| 4,415,618 | 11/1983 | McClung, Jr. | 428/90 |
| 5,134,008 | 7/1992 | Alm | 428/90 |

Primary Examiner—George F. Lesmes
Assistant Examiner—Terrel Morris
Attorney, Agent, or Firm—Gifford, Groh, Sprinkle, Patmore and Anderson

[57] ABSTRACT

A novel friction pad is disclosed for use with a motor vehicle window stabilizer of the type having at least one face which frictionally engages a window pane as it moves between its raised and its lowered position. The friction pad is constructed from an elastomeric substrate having a planar base and a plurality of spaced apart projections extending outwardly from one side of the base. The projections and the base are of a one piece construction. A coating of synthetic material, such as nylon or polyester, is then flocked onto the side of the base thus covering both that side of the base as well as the projections. The resulting friction pad is then secured to the confronting face of the window stabilizer.

5 Claims, 1 Drawing Sheet

FRICTION PAD FOR A WINDOW STABILIZER

BACKGROUND OF THE INVENTION

I. Field of the Invention

The present invention relates to a friction pad for use with a window stabilizer of a motor vehicle.

II. Description of the Prior Art

Many types of motor vehicles include one or more windows which are slidably mounted within a panel of the vehicle. For example, in a passenger car, the side window is conventionally slidably mounted within the door panel and movable between a raised or closed position and a lowered or open position.

In order to prevent rattling of the window within its associated vehicle panel, many previously known motor vehicles utilize window stabilizers mounted within the interior of the vehicle panel. These window stabilizers conventionally include one or more faces which engage a side of the window. In order to prevent scratching of the window as well as noise during opening and closing of the window, a friction pad is mounted on the face of the window stabilizer so that the friction pad, rather than the stabilizer, frictionally engages the window. By so engaging the window, the stabilizer with its attached friction pad prevents undesirable rattling of the window within its associated vehicle panel.

These previously known friction pads typically comprised an elongated strip of thin plastic material having an adhesive on both sides. Nylon bristles are then secured to the housing on one side of the strip while the other side of the strip is adhesively secured to the face of the window stabilizer. Consequently, as the window passes along the window stabilizer, the nylon bristles from the friction pad engage the window pane and prevent window rattling.

These previously known friction pads, however, have not proven wholly satisfactory in use. One disadvantage, of these previously known stabilizers, is that the nylon bristles attached to the adhesive strip on the friction pad frequently become loose and dislodged from the adhesive strip during the normal operation of the window. Consequently, after prolonged use of the window stabilizer, the bristles become worn away from the strip and thus no longer engage the window to prevent window rattling in the desired manner.

A still further disadvantage, of these previously known friction pads for window stabilizers, is that the adhesive on the friction pad inadequately or incompletely adheres to the face of the window stabilizer. When this happens, the entire friction pad can dislodge from its associated window stabilizer which renders the window stabilizer inoperative for its intended purpose. The friction pad which dislodges from its associated window stabilizer can also cause jamming of the window mechanism.

SUMMARY OF THE PRESENT INVENTION

The present invention provides a friction pad for a window stabilizer which overcomes all of the above mentioned disadvantages of the previously known devices.

In brief, the friction pad of the present invention comprises an elastomeric substrate having a generally planar base and a plurality of spaced apart projections which extend outwardly from one side of the base. The projections, as well as the base, are of a one piece construction of any conventional elastomeric material, such as flexible plastic.

A coating of synthetic material is then flocked onto the side of the base containing the projections so that the flocked material forms a coating on both the projections as well as the outwardly facing side of the base. Preferably, the flocked material comprises a nylon or polyester material.

Once the flocking has cured or dried, the resulting substrate with its coating of flocked material is then secured to the face of the window stabilizer so that the flocked side of the substrate is adapted to engage the window associated with the window stabilizer. Although the base can be adhesively secured to the window stabilizer, as in the prior known devices, alternatively, the base can be mechanically connected to the window stabilizer thus minimizing any chance of detachment of the friction pad from its window stabilizer.

BRIEF DESCRIPTION OF THE DRAWING

A better understanding of the present invention will be had upon reference to the following detailed description when read in conjunction with the accompanying drawing where like reference characters refer to like parts throughout the several views and in which.

DETAILED DESCRIPTION OF THE PREFERRED EMBODIMENT OF THE PRESENT INVENTION

Figure 1:
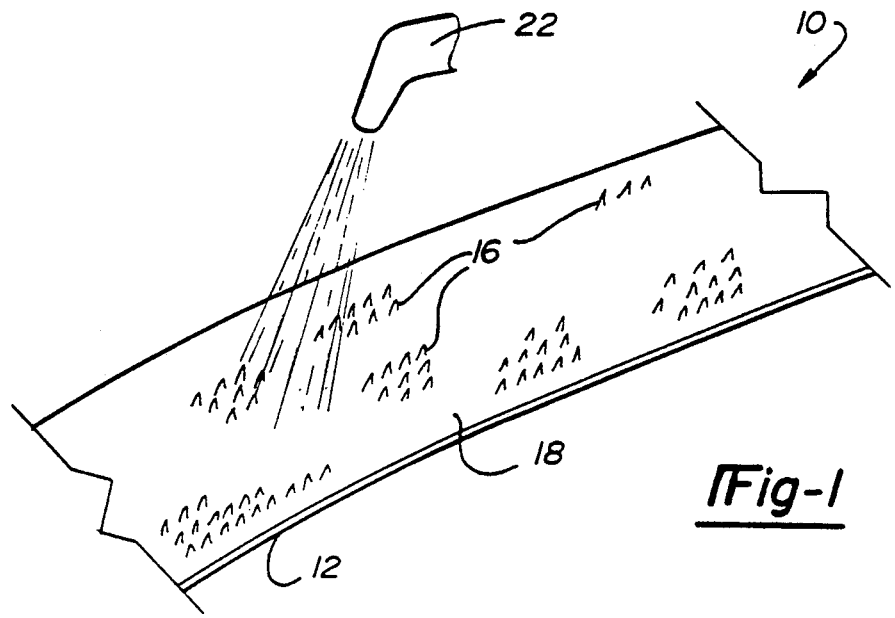
FIG. 1 is an elevational view illustrating the manufacture of the preferred embodiment of the friction pad of the present invention.
Figure 2:
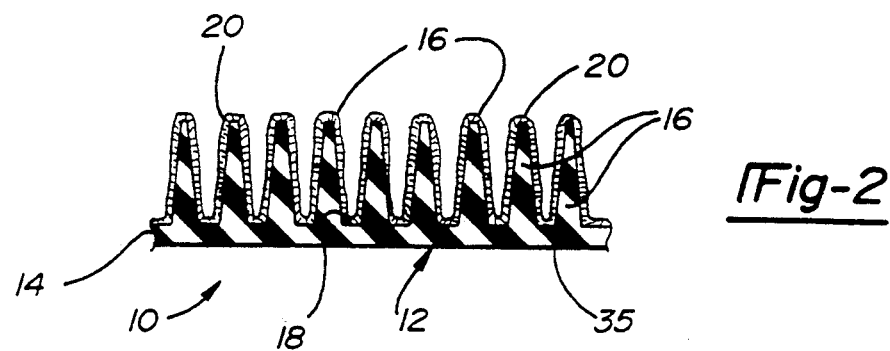
FIG. 2 is a sectional view illustrating a preferred embodiment of the present invention and enlarged clarity.

With reference first to FIGS. 1 and 2, a preferred embodiment of the friction pad 10 for a window stabilizer of a motor vehicle is there shown. The friction pad includes an elastomeric substrate 12 having a generally flat and planar base 14 and a plurality, of spaced apart projections 16 which extend outwardly from one side 18 of the base 12.

The projections 16 are preferably generally conical in shape and have a height at least twice and preferably several times their diameter at the point of junction with the substrate base 14. Additionally, the projections 16 are preferably spaced apart from each other by a distance less than their height as best shown in FIG. 2.

The substrate base 14 as well as the projections 16 are preferably of a one piece construction and are constructed from an elastomeric material which is both flexible and durable in construction. One material which can be used for the substrate 14 and the projections 16 is Dupont Alcryn, 2060 Black, Grade #DR0187E02. As set forth in U.S. Pat. No. 5,130,384, Alcryn is described as a chlorinated polyolefin. An alternative material that can be used for the substrate 14 and projections 16 is made by Monsanto under the trademark Vyram, Model No. 6101–70 Black. Vyram is a polyvinyl chloride and is registered under the Chemical Abstracts as CAS Registry No. 9002-86-2.

Still referring to FIGS. 1 and 2, the side 18 of the substrate base 14, as well as the projections 16, are covered with a coating 20 of material. This coating of material 20 is preferably applied to the substrate 12 by a conventional flocking gun 22 (FIG. 1) so that the flocked coating 20 is generally uniform along the side 18 of the substrate 12 as well as the outer surface of the projections 16.

The flocked coating 20 can comprise either nylon or polyester. One preferred form of flocked material is sold by Sellusuede, Inc. of Illinois having a length of 0.020 and a 1.5 denier. This material is sold as Material No. 7900 and comprises either nylon or polyester material or a mixture of nylon and polyester. Alternative flocking materials, however, can also be used for the coating 20.

After the flocked coating 20 is dried on the substrate 12, the flocked coating 20 forms a soft coating on the substrate 12 which will not scratch window glass.

Figure 3:
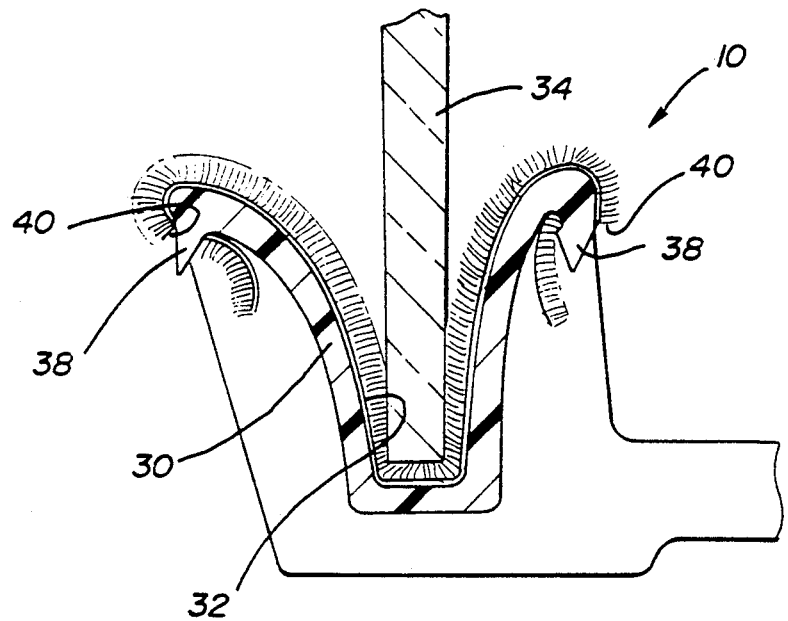
FIG. 3 is an elevational view illustrating the friction pad attached to a window stabilizer in a motor vehicle.

With reference now to FIG. 3, the friction pad 10 is there shown secured to a window stabilizer 30 having a face 32 which faces a window pane 34. The friction pad 10, which is flexible, is mounted along the face 32 of the window stabilizer 30 so that its flocked side 18 and projections 16 face and contact the window pane 34. In doing so, the friction pad 10 cushions the window pane 34 and prevents window rattling.

Any conventional means can be used to secure the friction pad 10 to its associated window stabilizer 30. For example, the side 35 of the substrate base 14 opposite from its flocked side 18 can be coated with an adhesive and mounted to the face 32 of the window stabilizer 30. Alternatively, however, because the substrate base 14 is relatively thick, a mechanical connection can be used between the window stabilizer 30 and the friction pad 10 in order to secure them together. One such mechanical connection is shown in FIG. 3 in which the window stabilizer includes one or more outwardly extending pins 38. These 30 includes one or more outwardly extending pins 38. These pins 38 extend through receiving holes 40 in the friction pad 10 thereby mechanically securing the friction pad 10 and window stabilizer 30 together.

From the foregoing, it can be seen that the friction pad of the present invention enjoys several advantages over the previously known devices for window stabilizers. One advantage of the present invention is that the friction pad can be inexpensively and rapidly manufactured.

A still further advantage of the present invention is that the flocking remains adhered to the substrate 12 despite extended use of the window mechanism.

A still further advantage of the present invention is that the relatively thick base 14, as compared to the thin adhesive strips previously employed in friction pads for window stabilizers, can be used as a mechanical element to mechanically secure the friction pad to the window stabilizer. This effectively prevents the separation of the friction pad from the window stabilizer known to the previous devices which simply adhere the friction pad to the window stabilizer.

Having described my invention, however, many modifications thereto will become apparent to those skilled in the art to which it pertains without deviation from the spirit of the invention as defined by the scope of the appended claims.

I claim:

1. A friction pad for use with a motor vehicle window stabilizer, the stabilizer having a face along which a window slidably extends, said friction pad comprising:
    an elastomeric substrate, said substrate having a generally planar base and a plurality of spaced apart projections extending outwardly from one side of said base, said projections and said base being of a one piece construction, said substrate includes at least one hole formed through at least one end of said substrate;
    a coating of synthetic flock material covering said one side of said base and said projections; and
    means for securing said substrate to the face of the stabilizer, said securing means comprises at least one pin extending outwardly from and secured to the stabilizer face, said at least one pin being adapted to be positioned through said at least one hole.

2. The invention as described in claim 1 wherein said coating of synthetic flock material is applied to said substrate by a flocking gun.

3. The invention as defined in claim 1 wherein said synthetic flock material comprises nylon.

4. The invention as defined in claim 1 wherein said synthetic flock material comprises polyester.

5. The invention as defined in claim 1 wherein said projections are projections are substantially circular in crossectional shape and wherein the length of said projections is greater than twice the diameter of said projections.

* * * * *